US012729709B2

(12) United States Patent
Beyer

(10) Patent No.: US 12,729,709 B2
(45) Date of Patent: Sep. 8, 2026

(54) SERVICEABLE POST RETAINER

(71) Applicant: Illinois Tool Works Inc., Glenview, IL (US)

(72) Inventor: Mark Beyer, Armada, MI (US)

(73) Assignee: Illinois Tool Works Inc., Glenview, IL (US)

( * ) Notice: Subject to any disclaimer, the term of this patent is extended or adjusted under 35 U.S.C. 154(b) by 338 days.

(21) Appl. No.: 18/649,536

(22) Filed: Apr. 29, 2024

(65) Prior Publication Data

US 2024/0384743 A1 Nov. 21, 2024

Related U.S. Application Data

(60) Provisional application No. 63/466,758, filed on May 16, 2023.

(51) Int. Cl.
*F16B 21/20* (2006.01)
*F16B 5/06* (2006.01)

(52) U.S. Cl.
CPC ............ *F16B 21/20* (2013.01); *F16B 5/0621* (2013.01)

(58) Field of Classification Search
CPC ............................... F16B 21/20; F16B 5/0621
USPC ........................................................ 411/517
See application file for complete search history.

(56) References Cited

U.S. PATENT DOCUMENTS 1,580,015 A * 4/1926 Clark ...................... F16B 39/24 411/131
2,568,584 A * 9/1951 Hartman ................. F16B 21/20 411/965
2,712,262 A * 7/1955 Knohl ..................... F16B 21/20 411/521
2,822,712 A * 2/1958 Garman .................. B25B 31/00 74/557
5,833,422 A * 11/1998 Haga ...................... F16B 21/20 411/521
11,149,775 B2 * 10/2021 Maloney ............... F16B 21/075
12,092,145 B2 * 9/2024 Jessop ................. F16B 37/0842
12,221,992 B2 * 2/2025 Li ......................... F16B 21/205
2012/0213580 A1 * 8/2012 Omori ..................... F16B 21/08 403/375
2019/0219087 A1 * 7/2019 Bentrim ................ F16B 21/076
2020/0173485 A1 * 6/2020 Kuemmel ........... F16B 37/0842
2024/0175461 A1 * 5/2024 Beyer ....................... F16B 5/02
2024/0200588 A1 * 6/2024 Beyer ..................... F16B 5/065
2024/0247672 A1 * 7/2024 Beyer ................. F16B 19/1081
2024/0384743 A1 * 11/2024 Beyer ..................... F16B 21/20

(Continued)

*Primary Examiner* — Muhammad Ijaz
(74) *Attorney, Agent, or Firm* — McAndrews, Held & Malloy, Ltd.

(57) ABSTRACT

Disclosed is a push-on fastener to couple a first component to a second component via a post associated with the second component. The push-on fastener includes an annular body, a retention flange, and a release tab. The annular body defines a topside surface, an underside surface, and a retainer opening configured to receive at least a portion of the post. The retention flange is resiliently coupled to the annular body and arranged to engage the post. The retention flange is oriented toward a center of the retainer opening and canted away from the topside surface at a first angle. The release tab is coupled to the retention flange and flexes or to biases the retention flange away from the post to enable removal of the push-on fastener from the post.

20 Claims, 9 Drawing Sheets

(56) References Cited

U.S. PATENT DOCUMENTS

2024/0426331 A1* 12/2024 Rusch ........................ E04G 9/02
2025/0341227 A1* 11/2025 Beyer ................... F16B 5/0258

* cited by examiner

SERVICEABLE POST RETAINER

CROSS-REFERENCE

The present application claims priority to U.S. Provisional Patent Application No. 63/466,758, filed May 16, 2023, and entitled "Serviceable Post Retainer" which is hereby incorporated by reference in its entirety.

BACKGROUND

Automotive components require fastening techniques that are simple to manufacture and assemble. Further, fastening techniques should above all be reliable and efficient. In order to secure component (e.g., a secondary panel and a primary panel), a post retainer may be used to engage a post.

In some examples, a push-on fastener features inner retainer fingers that bite into the material of the post upon which they are applied to provide maximum holding strength. Such push-on fastener are useful in that they can be easily applied with minimal a push-on force. Push-on fastener are self-locking and are used in applications where screws or bolts need to be retained in place before a nut is put in place and tightened.

Typically, push-on fasteners cannot be removed without damaging or scoring the post and, therefore, are typically not suitable for applicable where the push-on fastener needs to be removed periodically. For example, if the push-on fastener is used in an application that requires periodic servicing, using a traditional push-on fastener will harm or destroy the post over time, thus resulting in a poor or non-existent connection.

Therefore, despite various advancements to date, it would nevertheless be desirable to provide a push-on fastener that can be removed without materially harming or damaging the post or the push-on fastener.

SUMMARY

The present disclosure relates generally to a push-on fastener, substantially as illustrated by and described in connection with at least one of the figures, as set forth more completely in the claims. More particularly, to a push-on fastener that can be removed without damage or scoring to the post or the push-on fastener.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

Figures 1A, 1B:
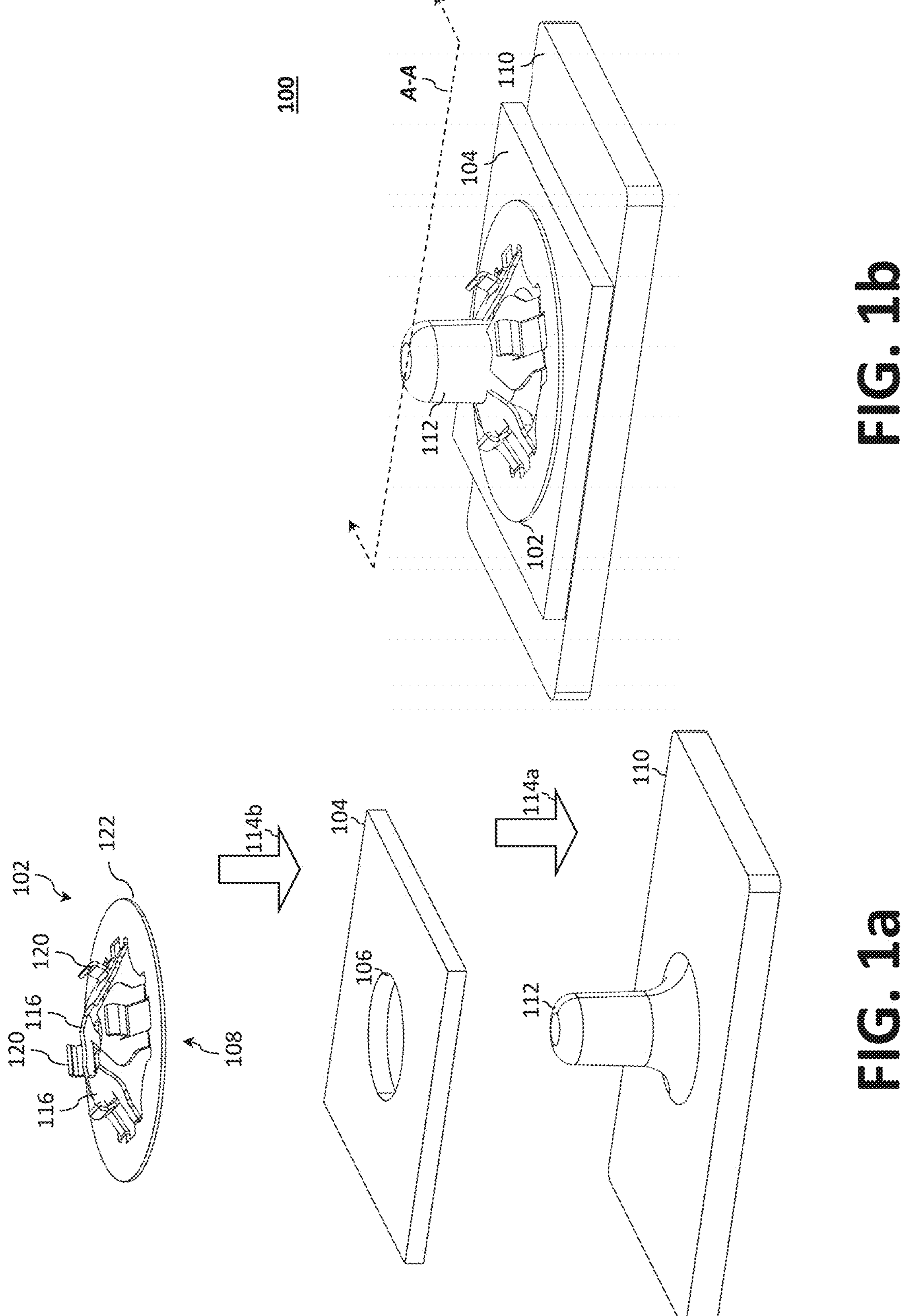

FIGS. 1*a* and 1*b* illustrate, respectively, isometric assembly and assembled views of an example fastening system in accordance with an aspect of this disclosure.

Figure 1C:
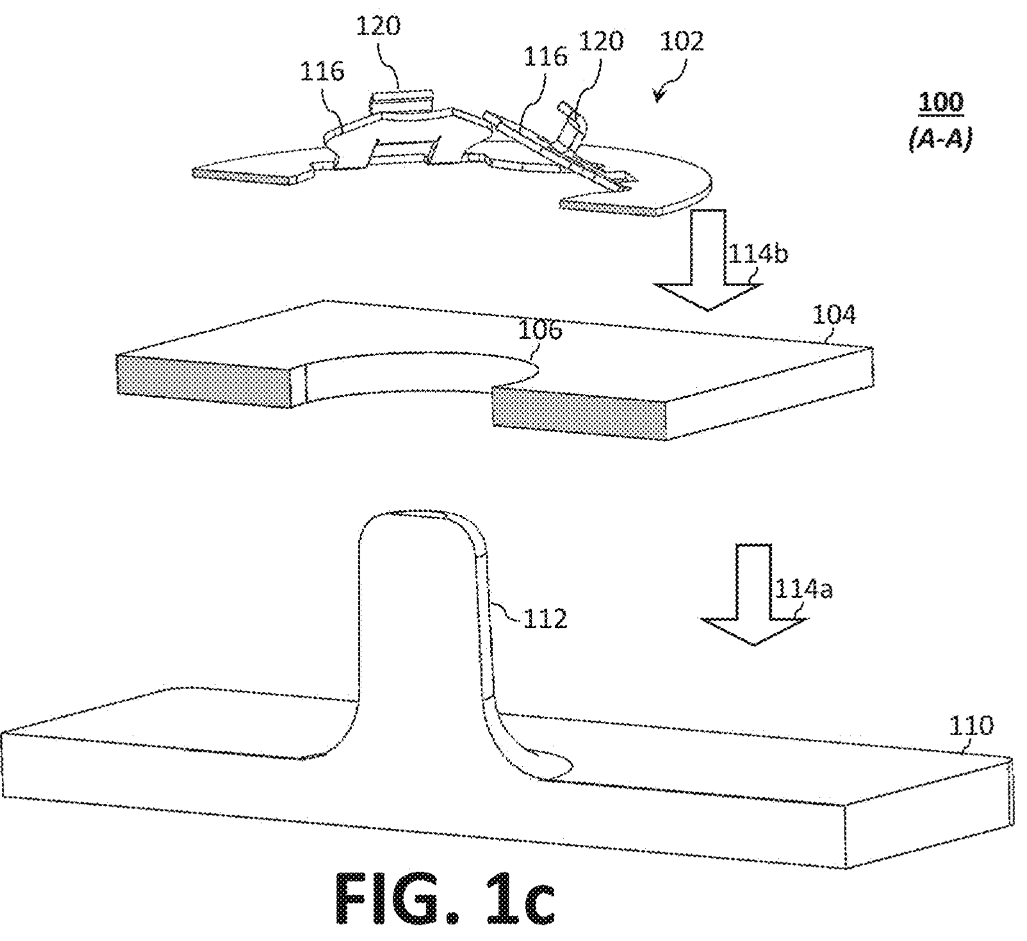
Figure 1D:
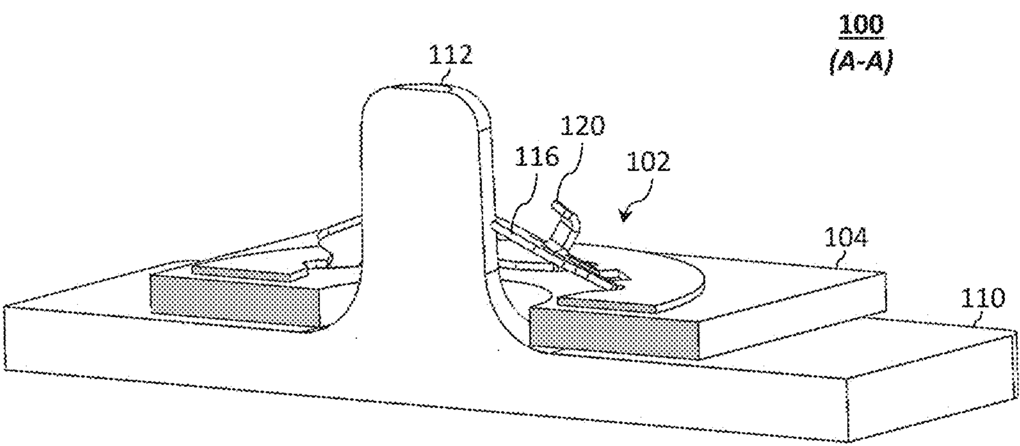

FIGS. 1*c* and 1*d* illustrate, respectively, cross-sectional isometric assembly and assembled views of the example fastening system of FIGS. 1*a* and 1*b* taken along cut line A-A (FIG. 1*b*).

Figure 2A:
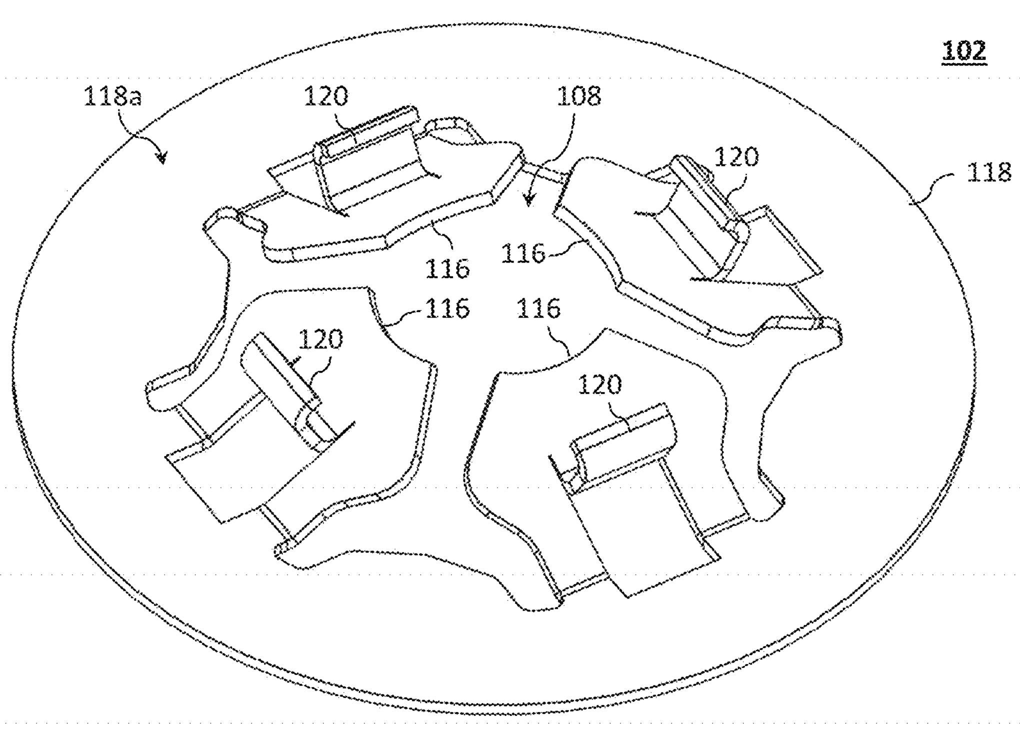

FIG. 2*a* illustrates a topside isometric view of the push-on fastener of FIGS. 1*a* through 1*d*.

Figure 2B:
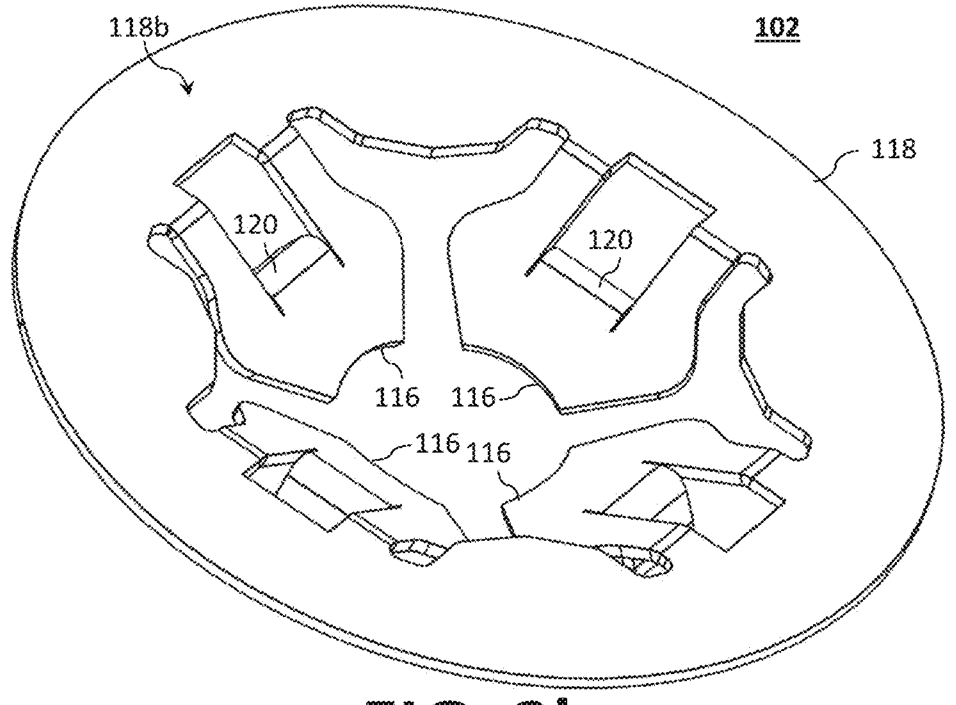
Figure 2C:
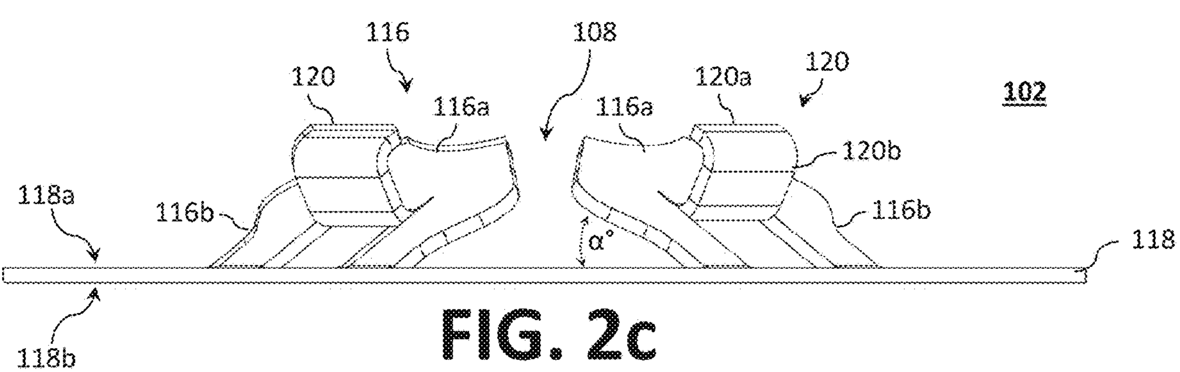
Figure 2D:
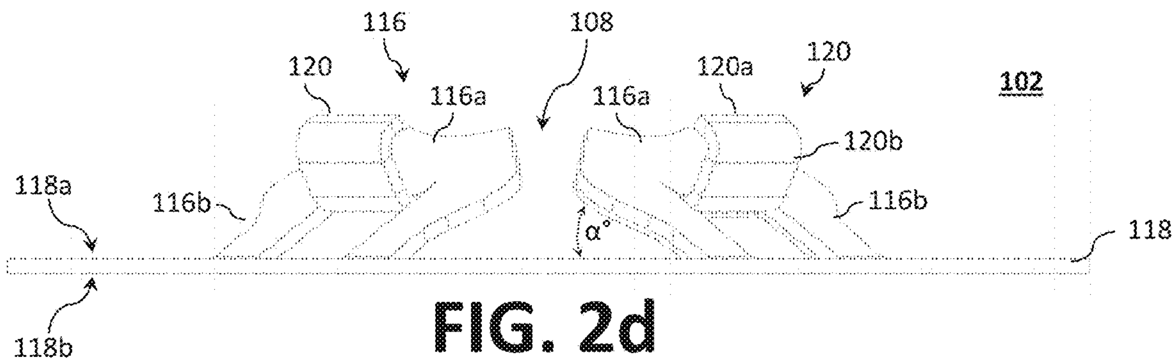
Figure 2E:
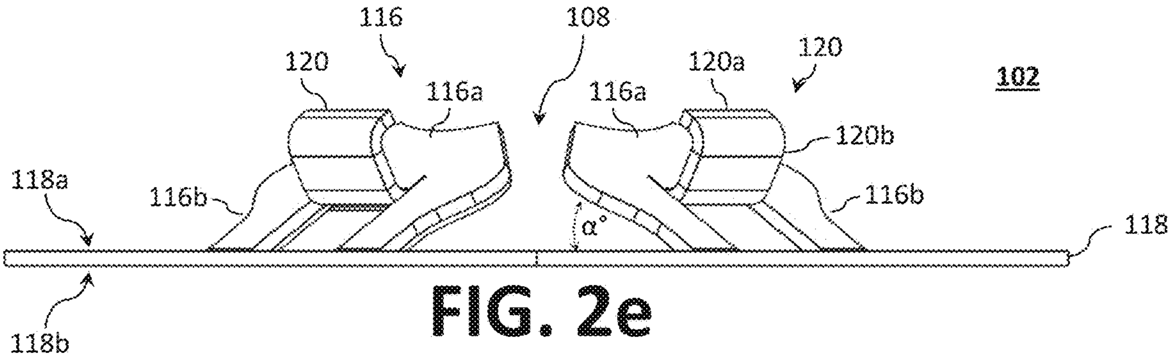
Figure 2F:
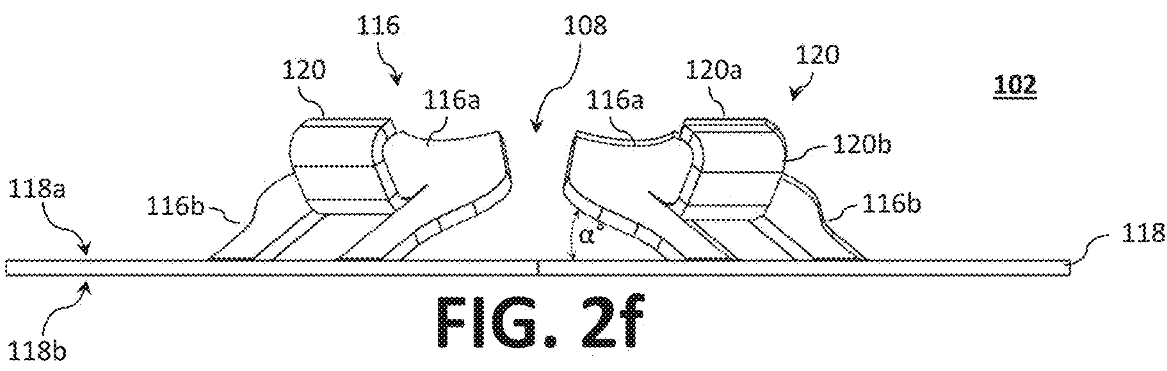

FIG. 2*b* illustrates an underside isometric view of the push-on fastener.

FIGS. 2*c* through 2*f* illustrate, respectively, first, second, third, and fourth side elevation views of the push-on fastener.

Figures 2G, 2H:
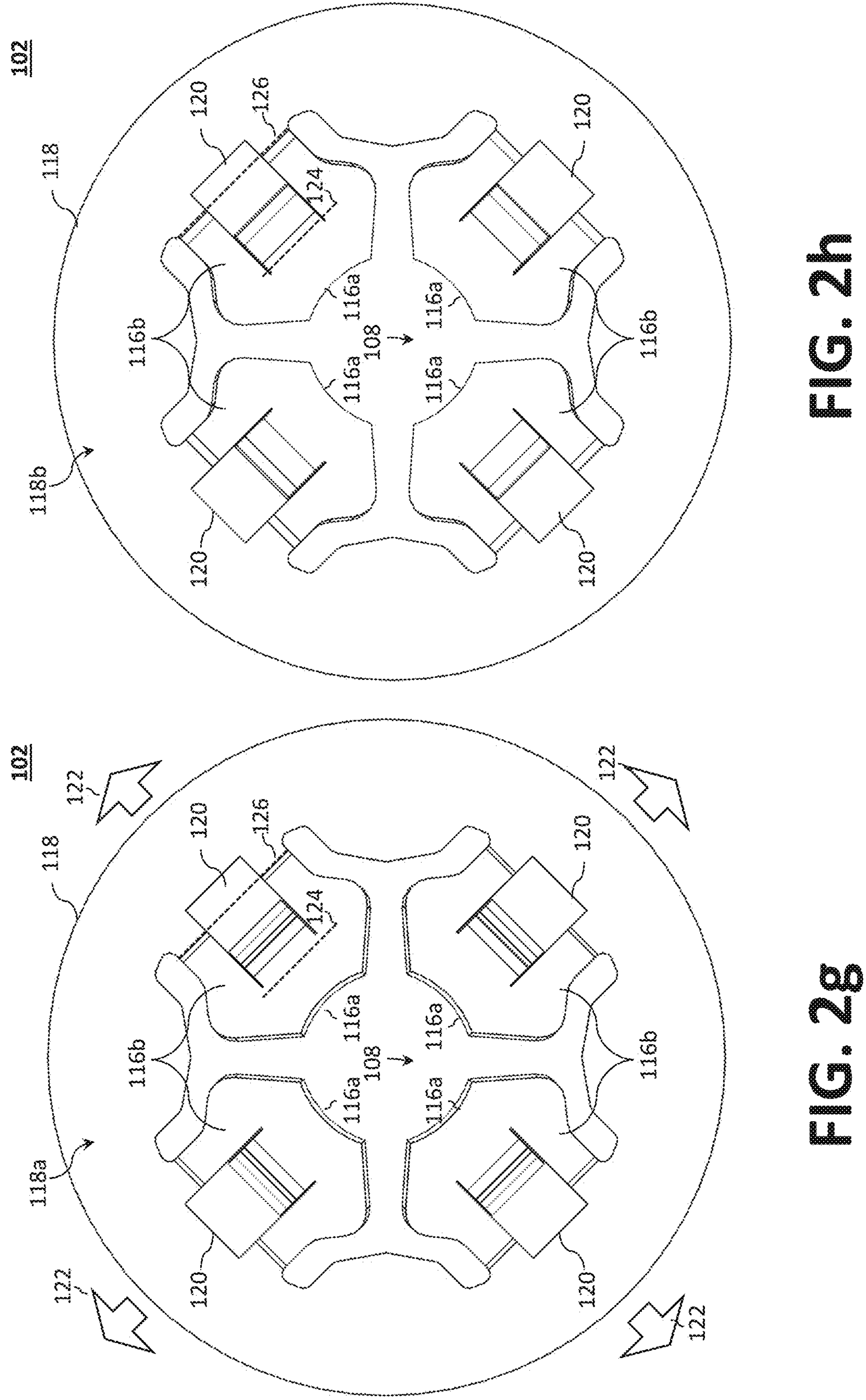

FIGS. 2*g* and 2*h* illustrate, respectively, topside and underside plan views of the push-on fastener.

Figure 3A:
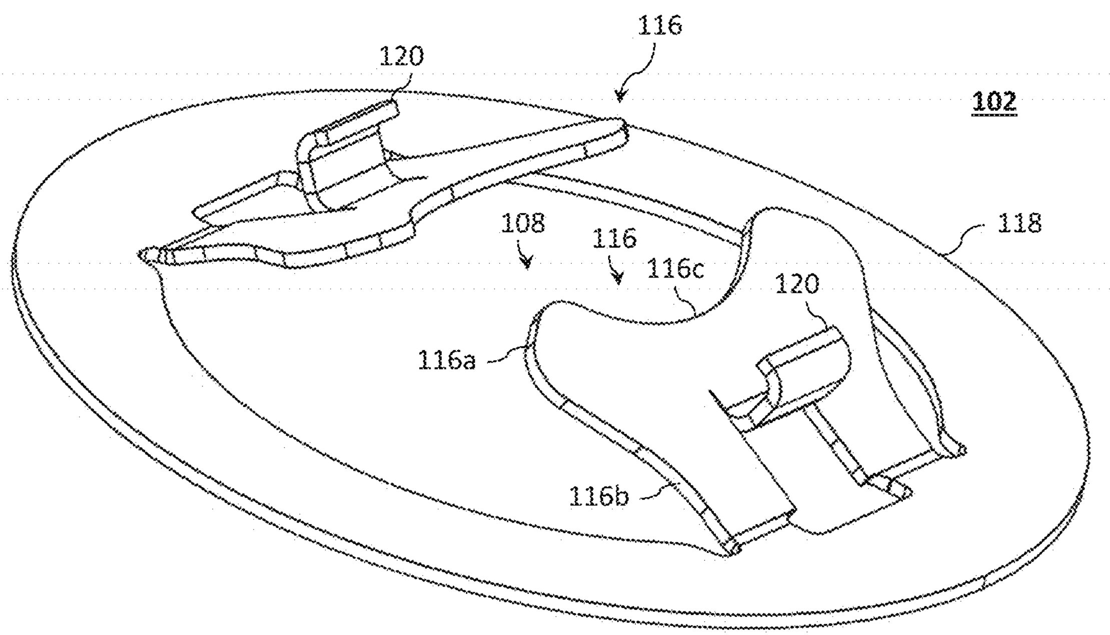
Figure 3B:
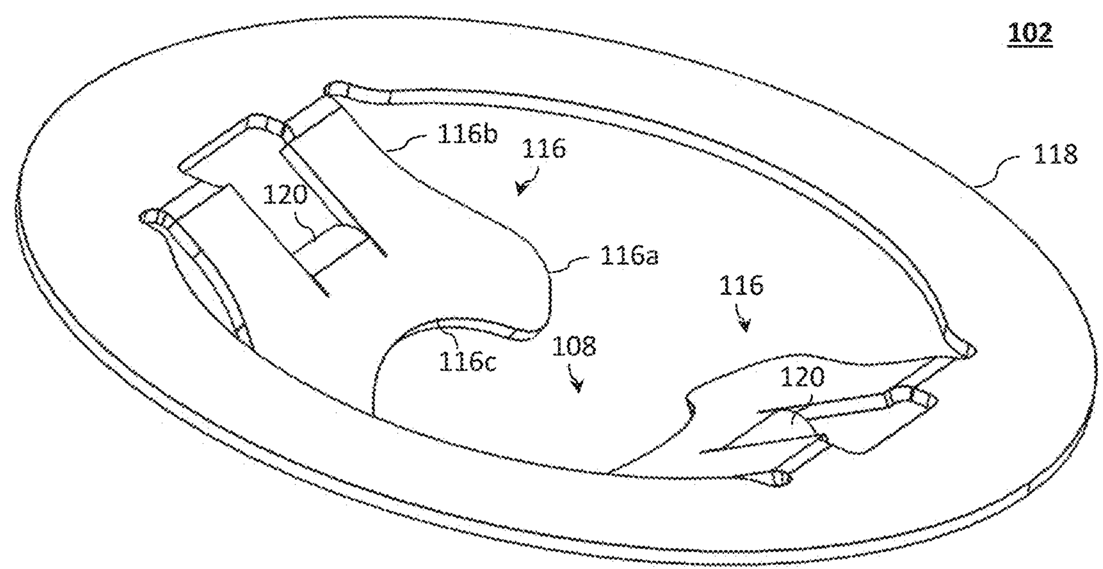
Figure 3C:
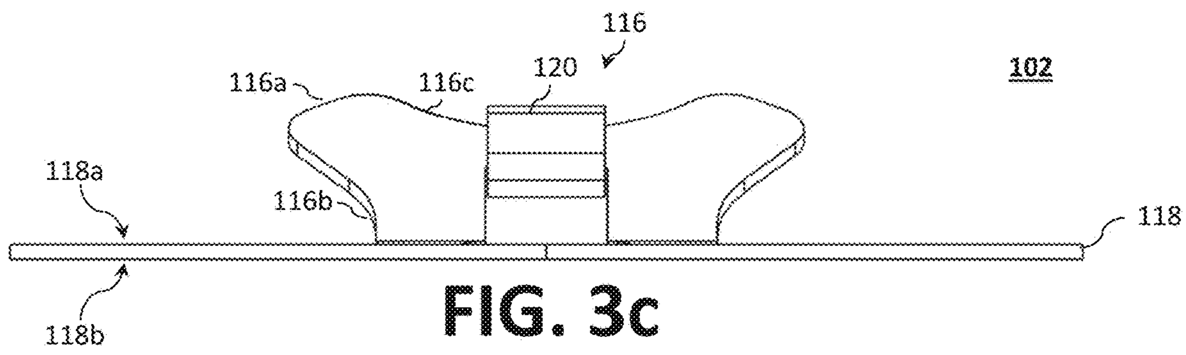
Figure 3D:
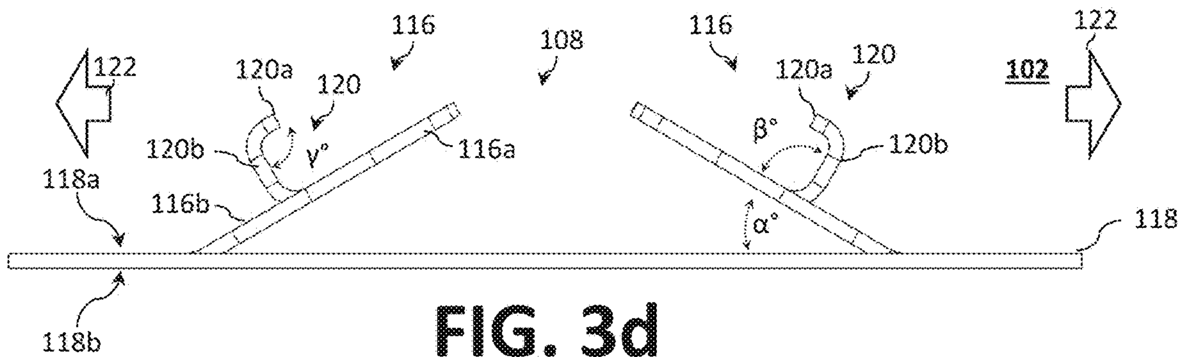
Figure 3E:
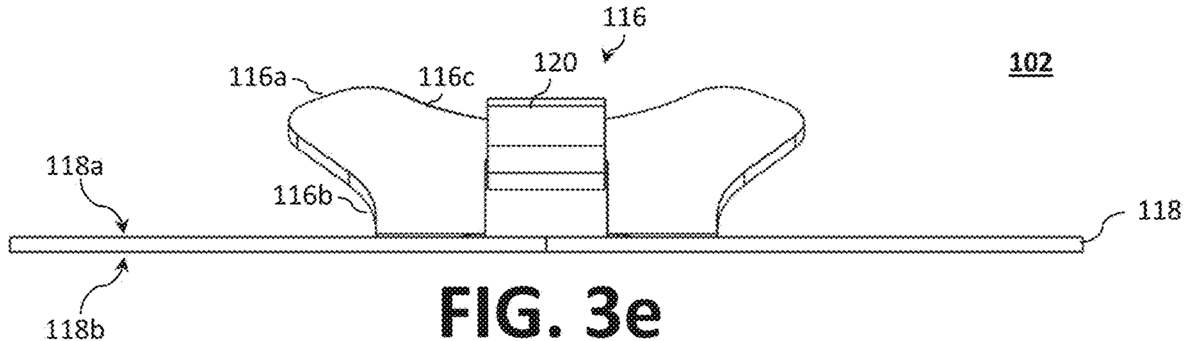
Figure 3F:
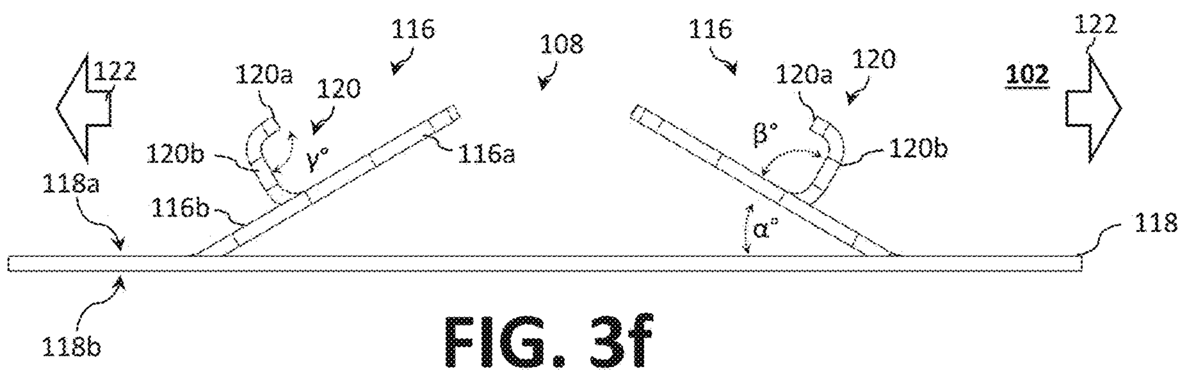

FIGS. 3*a* and 3*b* illustrate, respectively, topside and underside isometric views of the push-on fastener in accordance with another aspect of this disclosure.

FIGS. 3*c* through 3*f* illustrate, respectively, first, second, third, and fourth side elevation views of the push-on fastener of FIGS. 3*a* and 3*b*.

Figures 3G, 3H:
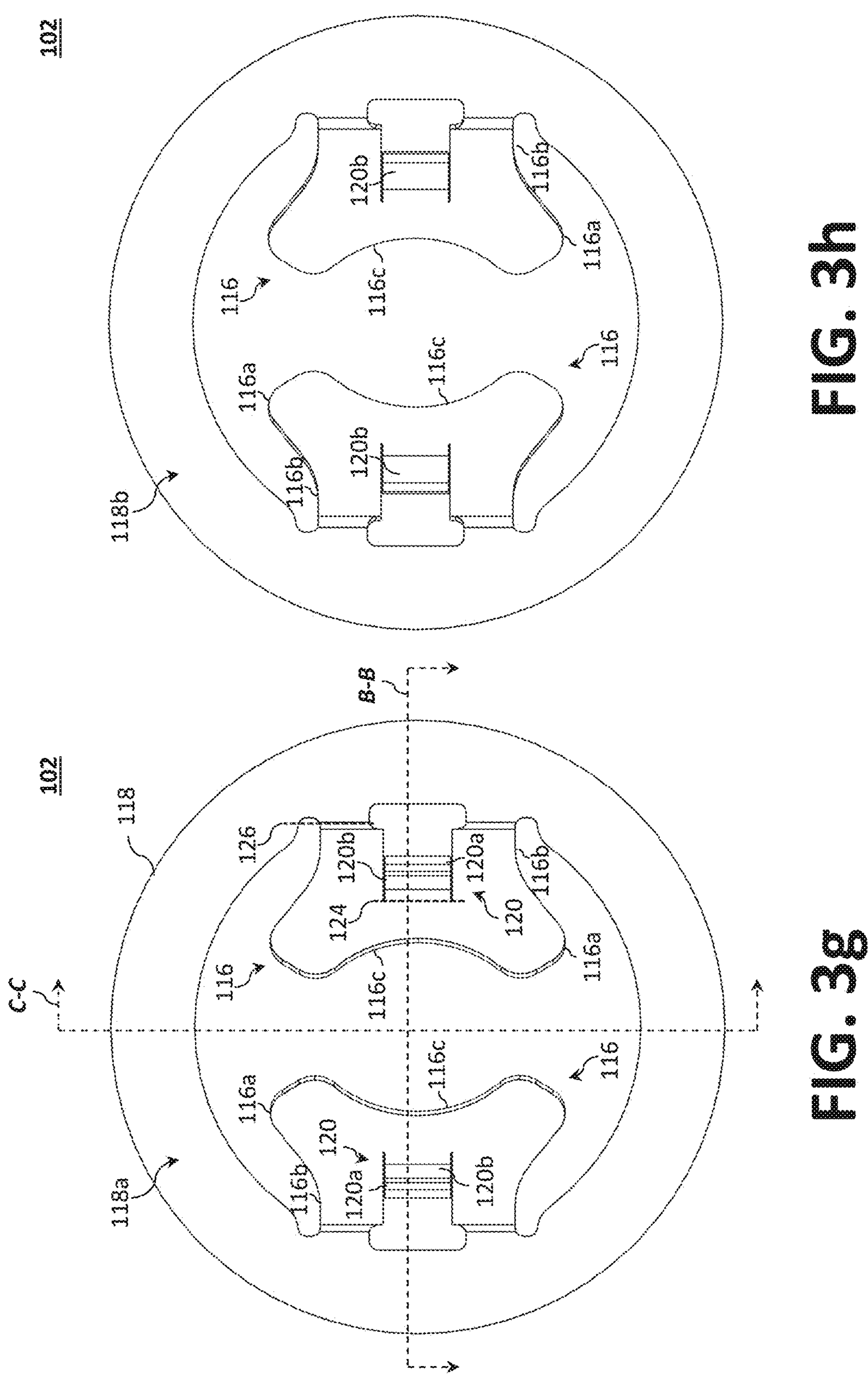

FIGS. 3*g* and 3*h* illustrate, respectively, topside and underside plan views of the push-on fastener of FIGS. 3*a* and 3*b*.

Figures 3I, 3J:
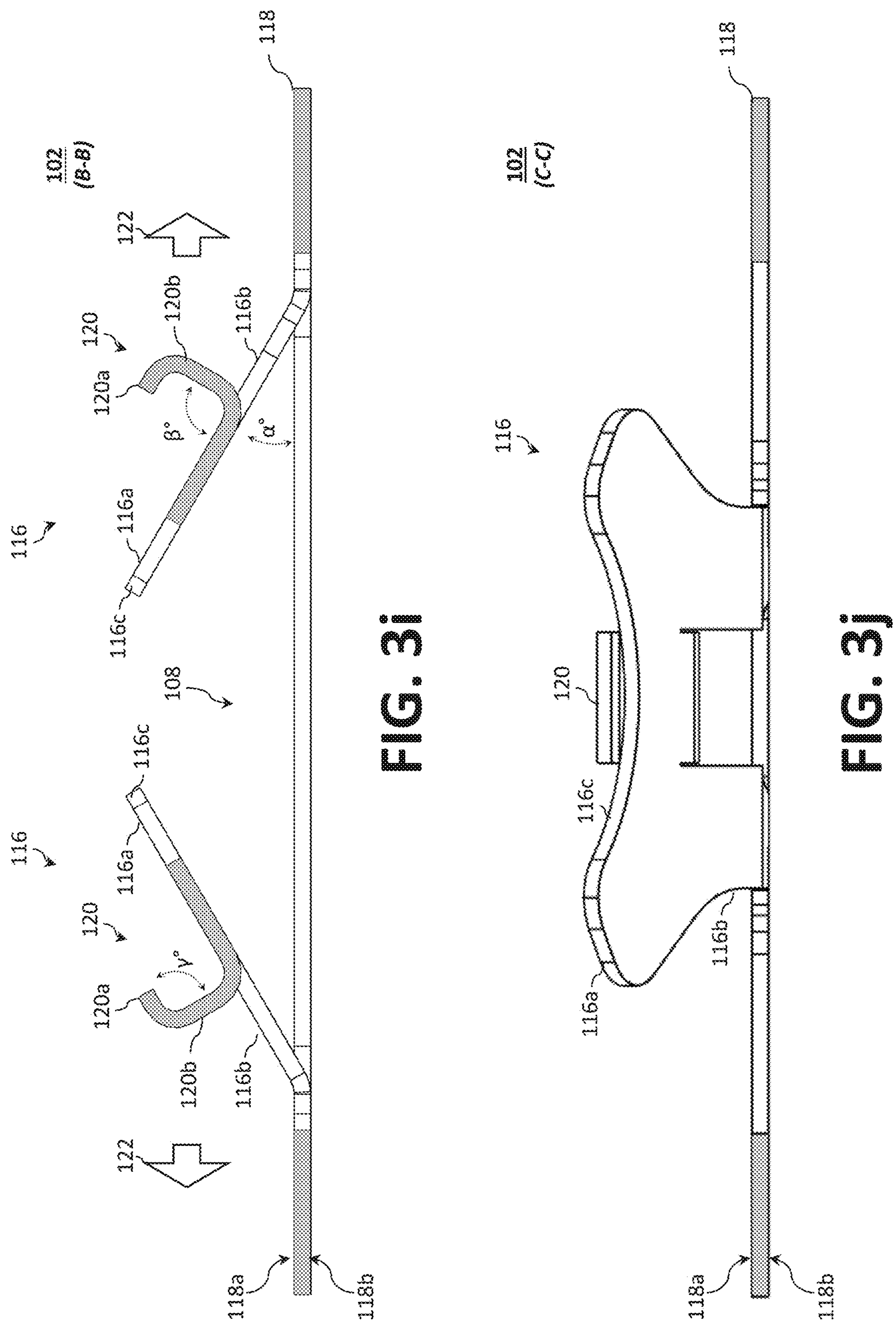

FIGS. 3*i* and 3*j* illustrate, respectively, cross-sectional views of the push-on fastener taken along cut lines B-B (FIG. 3*g*) and C-C (FIG. 3*g*).

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Push-on fasteners can be used in multiple locations to attach components to a tubular shaped feature, such as a post. Applications including, for example, attachment of sound blankets and wheel well liners. Push-on fasteners are effective at retaining to the post, but historically cannot be easily removed and often show signs of damage to the post when removed. As large casted components are becoming more prevalent in the automotive industry, use a round, tubular-shaped cast attachment posts are becoming more prevalent.

The deficiencies of existing push-on fasteners include their lack of serviceability. That is, end-users desire push-on fasteners that are serviceable without exhibiting the damage as seen from existing one-piece push-on fasteners. That is, in order to service a component, removing existing push-on fastener often requires destroying the push-on fastener and/or the attachment post. For example, while a push-on fastener is easily installed by pushing it onto a post, removal (e.g., through a pulling motion) often damages the push-on fastener and/or the post during removable.

Disclosed is a serviceable one-piece push-on fastener having one or more release tabs in the center section of the retention flanges to release or disengage the post. The release tabs thereby allow an operator to flex, bend, or otherwise bias the retention flanges back slightly and away from the post (e.g., through use of tool or reverse type pliers), removing the tension/clamp force on post to allow for the retainer to be removed from the post without significant marring/damage. The use of the one or more release tabs for service also prevents or mitigates damage to the retainer during removal, allowing for the reuse of the retainer after service. Typical retainers of this fashion commonly have high installation efforts onto a post, and often require the use of a secondary installation tool to prevent injury to the worker. The disclosed serviceable post retainer, however, allows for the removal of the retainer with minimal impact to the post structure. Finally, the disclosed serviceable post retainer allows for lower installation effort due to the increased flexibility of the retention flanges.

Therefore, disclosed is an improved one-piece push-on fastener assemblies that offers, inter alia, the advantage of serviceability. The disclosed push-on fastener is serviceable both in terms of preventing damage to the post and in preventing damage to the push-on fastener during removal. Accordingly, the disclosed push-on fastener can be reused as it is not damaged during removal.

In one example, a push-on fastener to couple a first component to a second component via a post associated with the second component comprises: an annular body with a topside surface and an underside surface, wherein the annular body defines a retainer opening configured to receive at least a portion of the post; a retention flange resiliently coupled to the annular body and configured to engage the post, wherein the retention flange is oriented toward a center of the retainer opening and canted away from the topside surface at a first angle; and a release tab coupled to the retention flange and configured to flex or to bias the retention flange away from the post.

In another example, stamped-metal push-on fastener to couple a first component to a second component via a post associated with the second component comprises: an annular body with a topside surface and an underside surface, wherein the annular body defines a retainer opening configured to receive at least a portion of the post; a plurality of retention flanges resiliently coupled to the annular body and configured to engage the post, wherein each of the plurality of retention flanges is oriented toward a center of the retainer opening and canted away from the topside surface at a first angle; and a plurality of release tabs, wherein each of the plurality of release tabs is coupled to one of the plurality of retention flanges and configured to flex or to bias the said one of the plurality of retention flanges away from the post.

In yet another example, a stamped-metal push-on fastener to couple a first component to a second component via a post associated with the second component comprises: an annular body with a topside surface and an underside surface, wherein the annular body defines a retainer opening configured to receive at least a portion of the post; and a plurality of retention flanges resiliently coupled to the annular body and configured to engage the post, wherein each of the plurality of retention flanges is oriented toward a center of the retainer opening and canted away from the topside surface at a first angle, and wherein each of the plurality of retention flanges comprises a release tab formed therein and configured to flex or to bias the retention flanges away from the post.

In some examples, the retention flange comprises a resilient leg portion and a head portion positioned an end of the resilient leg portion. The release tab can be punched and bent from the resilient leg portion.

In some examples, the first angle is between 15 and 45 degrees.

In some examples, the release tab is canted away from the retention flange at a second angle. The second angle can be, for example, between 80 and 100 degrees.

In some examples, the release tab comprises a catch portion and a sidewall portion. The sidewall portion can be bent at an edge to form the catch portion.

In some examples, the retention flange is configured to release the push-on fastener from the post when biased via the release tab.

In some examples, the push-on fastener is a stamped-metal component.

FIGS. 1*a* and 1*b* illustrate, respectively, isometric assembly and assembled views of an example fastening system 100 in accordance with an aspect of this disclosure, while FIGS. 1*c* and 1*d* illustrate, respectively, cross-sectional isometric assembly and assembled views of the example fastening system 100 of FIGS. 1*a* and 1*b* taken along cut line A-A. As illustrated, the fastening system 100 includes a push-on fastener 102 configured to join a first component 104 to a second component 110 via an opening 106 associated with the first component 104 and a post 112 (or stud, bolt, threaded shaft, etc.) associated with the second component 110.

While only a single push-on fastener 102 is illustrated in the examples, it should be appreciated that multiple push-on fasteners 102 and posts 112 may be used to couple a first component 104 to a second component 110, depending on the number of fastener points needed between the first and second components 104, 110. For example, larger components and panels typically require multiple fastening points.

The first component 104 and the second component 110 may be, for example, automotive panels. Depending on the application, the first component 104 and the second component 110 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In the automotive industry, example first components 104 include, without limitation, door trim panels, moldings, trim pieces, and other substrates (whether used as interior or exterior surfaces). The second component 110 may be, for example, a structural component of a vehicle, such as doors, pillars (e.g., an A-pillar, B-pillar, C-pillar, etc.), dashboard components (e.g., a cross member, bracket, frame, etc.), seat frames, center consoles, fenders, sheet metal framework, or the like.

The first component 104 includes one or more openings 106 configured to receive at least a portion of the post 112, while the second component 110 includes one or more posts 112 configured to engage the one or more push-on fasteners 102 via the opening(s) 106. The opening 106 can be formed in the first component 104 during manufacturing thereof or added post-manufacture through a mechanical process (e.g., drilling, cutting, carving, etc.). As illustrated, each of the one or more posts 112 is generally perpendicular to the second component 110. The push-on fastener 102 may be fabricated from a generally rigid material, such as metal, synthetic or semi-synthetic polymers, composite materials, or a combination thereof. In some examples, as will be discussed, the push-on fastener 102 is fabricated from a sheet of metal using a metal stamping and bending process.

Depending on the material type, the one or more posts 112 may be formed during casting, molding, or layup of the second component 110, or attached after fabrication (e.g., using adhesive or mechanical fasteners). In some examples, the second component 110 and its one or more posts 112 are cast structures. A cast structure, in an automotive context, refers to a frame, chassis, or other component that is produced using a casting process. The choice of metal for casting can vary but often includes materials like iron or aluminum.

During assembly, the first component 104 can be pushed onto the post 112 in the direction indicated by arrow **114*a* such that the post 112 passes through the opening 106 formed in the first component 104 (or vice versa, for example, where the first component 104 is stationary and the second component is moved relative to the first component 104). The push-on fastener 102 can then be similarly pushed onto the post 112 in the direction indicated by arrow 114*b*, thus securing the first component 104 relative to the second component 110. After assembly, as best illustrated in FIG. 1*b*, the second component 110 is covered at least partially by the first component 104. As illustrated, the push-on fastener 102 defines a retainer opening 108 configured to receive the post 112**.

The details and features of the push-on fastener 102 are better-illustrated in connection with FIGS. **2*a* through 2*h*. Specifically, FIGS. 2*a* and 2*b* illustrate, respectively, topside and underside isometric views of the push-on fastener 102 of FIGS. 1*a* through 1*d*. FIGS. 2*c* through 2*f* illustrate, respectively, first, second, third, and fourth side elevation views of the push-on fastener 102, while FIGS. 2*g* and 2*h* illustrate, respectively, topside and underside plan views of the push-on fastener 102**.

The push-on fastener 102 generally comprises an annular body 118 that defines the retainer opening 108, one or more retention flanges 116 (a plurality, as illustrated) configured to engage the post 112, and one or more release tabs 120 formed in or on each of the one or more retention flanges 116. As illustrated, the annular body 118 is generally planar and defines a topside surface **118*a* and an underside surface 118*b*. In the illustrated example, a release tab 120 is punched and formed in each of the retention flanges 116. For example, the release tab 120 is punched from a center section of each of the retention flanges 116 (e.g., punched and bent from the resilient leg portion 116*b***).

As illustrated, the annular body 118 generally resembles a washer—i.e., a circular flat body with the retainer opening 108 at the center of the circular flat body. The retainer opening 108 can be a generally circular opening (as illustrated) or a clipped circular opening (e.g., D-shaped). The annular body 118 provide a flat, planar surface that allows a tool to push the push-on fastener 102 onto the post 112.

The retention flanges 116 of the push-on fastener 102 are formed from or on the annular body 118. As illustrated, each of the retention flanges 116 is resiliently coupled to the annular body 118 and is canted upward relative to the annular body 118 (e.g., canted away from the topside surface **118*a*). As used herein, components or portions of the push-on fastener 102** are said to be resiliently coupled or connected when the components or portions default (e.g., spring back) to a predetermined shape.

As illustrated, the retention flanges 116 are positioned on the annular body 118 such that the retention flanges 116 are distributed around the retainer opening 108. In the illustrated example, the four retention flanges 116 are positioned on the annular body 118. More specifically, the four retention flanges 116 are distributed 90 degrees about the retainer opening 108. While a total of four retention flanges 116 are illustrated, the total number of retention flanges 116 positioned around the retainer opening 108 of the push-on fastener 102 can be increased or decreased based on the retention and insertion forces needed (or desired) relative to the post 112. For example, the push-on fastener 102 described in connection with FIGS. **3*a* through 3*j* comprises two retention flanges 116 distributed 180 degrees about the retainer opening 108. In another example, three retention flanges 116 can be distributed 120 degrees about the retainer opening 108**.

The one or more retention flanges 116 extend inward toward a center of the retainer opening 108 and are canted upwardly away from the topside surface **118*a* of the annular body 118 at an angle ($\alpha$). The angle ($\alpha$) may be for example, about 15 to 45 degrees, about 20 to 40 degrees, or about 30 degrees (as illustrated). By angling the one or more retention flanges 116 upward away from the topside surface 118*a* of the annular body 118 at the angle ($\alpha$), the push-on fastener 102 can slide over the post 112 during assembly without requiring excessive assembly force, but, once assembled, the push-on fastener 102 cannot easily slide off the post 112 as the angle ($\alpha$) causes the one or more retention flanges 116 to, in effect, dig into the post 112 at or near its base end until either (1) a sufficient pull force is applied at the push-on fastener 102 to overcome the engagement between the one or more retention flanges 116 and the post 112 or (2) the push-on fastener 102** is released for removal, as will be described.

The retention flanges 116 secure the post 112 via an interference fit. In the illustrated example, each of the retention flanges 116 is illustrated as having a head portion **116*a* positioned the end of a resilient leg portion 116*b*. The distal edge 116*c* of each of the retention flanges 116 is configured to engage and hold onto the post 112 via the interference fit when the post 112 is at or near the center of the retainer opening 108. The distal edge 116*c* of the head portion 116*a* can be shaped to compliment an exterior surface shape or contour of the post 112 (e.g., curved) to increase surface area contact with and/or to dig into an exterior surface of the post 112. The flexibility and angle of the retention flanges 116 provide tolerance compensation for slightly different sized posts 112**.

The shape of the retention flanges 116, including length, width, and thickness, however, can be varied to change push-on and retention forces. For example, as illustrated, the width of the head portion **116*a* can be wider than the width of the resilient leg portion 116*b*. In some examples, additional cutouts (e.g., in addition to or in lieu of the cutout used to form the release tab(s) 120) can be added to the retention flanges 116 to reduce the forces and allow for more flexibility (and to reduce material usage). Including the cutouts decreases rigidity of the material to thereby allow the material to more easily deflect during installation or assembly. For example, the cutouts may be circular and positioned at a flange bend line 126, i.e., where the retention flanges 116 attach and flex relative to the annular body 118**.

In the illustrated example, each of one or more release tabs 120 are formed from or on a retention flange 116 and extend upwardly away from topside surface thereof. The one or more release tabs 120 are configured to flex and/or bias the retention flanges 116 away from the post 112 when engaged by an operator (whether by hand or via a tool) to disengage the post 112 and to thereby remove the push-on fastener 102. For example, each of the retention flanges 116 can be engaged via the one or more release tabs 120 and biased away from the post 112 as indicated by arrows 122. In this example, the release tabs 120 also form a cutout in the retention flange 116 to reduce insertion forces of the retention flanges 116.

The one or more release tabs 120 are bent upwardly (away from the topside of the retention flange 116) at the tab bend line 124 at an angle (β). The angle (β) may be for example, about 90 to 110 degrees, about 90 to 100 degrees, or about 90 degrees (as illustrated). That is, the one or more release tabs 120 are illustrated as generally perpendicular to a plane defined by its respective retention flange 116.

In the illustrated example, each of one or more release tabs 120 comprises a catch portion 120*a* and a sidewall portion 120*b*. For example, the sidewall portion 120*b* can be bent at its distal end at an angle (γ) to form the catch portion 120*a*. The angle (γ) may be for example, about 80 to 100 degrees, about 85 to 95 degrees, or about 90 degrees (as illustrated). In addition to increasing rigidity and orienting potentially sharp edges inwardly (i.e., away from the operator), the catch portion 120*a* can serve as an additional engagement feature to which a removal tool can cooperate and/or engage during removal of the push-on fastener 102. For example, when a removal tool is used to bias the retention flanges 116 away from the post 112 as indicated by arrows 122, the catch portion 120*a* can mitigate risk of the removal tool slipping off of the sidewall portion 120*b* when a force is applied against the sidewall portion 120*b* in the direction indicated by arrows 122.

The push-on fastener 102 can be manufactured as a single component as a stamped-metal component (e.g., via a metal stamping process); however, it is contemplated that they can be manufactured as separate components and joined thereafter (e.g., through adhesives, welding, etc.). As illustrated, each of the release tabs is folded, bent, or otherwise connected to the retention flange 116 at a tab bend line 124 (or fold line), while each of the retention flange 116 is folded, bent, or otherwise connected to the annular body 118 at a flange bend line 126.

As noted, the push-on fastener 102 can be removed from the post 112 without causing damage to the post 112 (and enabling reuse of the push-on fastener 102). To remove the push-on fastener 102, one or more (or all) of the retention flanges 116 can be pushed or biased outwardly via the release tabs 120 (away from the retainer opening 108) such that the distal edge 116*c* disengages the post 112 to thereby release the push-on fastener 102 such that it can be slid off the post 112 without harming to the post 112.

FIGS. 3*a* and 3*b* illustrate, respectively, topside and underside isometric views of the push-on fastener 102 in accordance with another aspect of this disclosure, while FIGS. 3*c* through 3*f* illustrate, respectively, first, second, third, and fourth side elevation views of the push-on fastener 102 and FIGS. 3*g* and 3*h* illustrate, respectively, topside and underside plan views of the push-on fastener 102. FIGS. 3*i* and 3*j* illustrate, respectively, cross-sectional views of the push-on fastener 102 taken along cut lines B-B (FIG. 3*g*) and C-C (FIG. 3*g*).

The push-on fastener 102 of FIGS. 3*a* through 3*j* is substantially the same as that of FIGS. 1*a* through 1*d* and FIGS. 2*a* through 2*h* except for the number and the size of retention flanges 116. While in the prior example, the push-on fastener 102 included four retention flanges 116, in this example, the push-on fastener 102 comprises two, larger retention flanges 116 positioned around the retainer opening 108 of the push-on fastener 102. As illustrated, the two retention flanges 116 are distributed 180 degrees about the retainer opening 108.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed:

1. A push-on fastener to couple a first component to a second component via a post associated with the second component, the push-on fastener comprising:

- an annular body with a topside surface and an underside surface, wherein the annular body defines a retainer opening configured to receive at least a portion of the post;
- a retention flange resiliently coupled to the annular body and configured to engage the post, wherein the retention flange is oriented toward a center of the retainer opening and canted away from the topside surface at a first angle; and
- a release tab coupled to the retention flange and configured to flex or to bias the retention flange away from the post.

2. The push-on fastener of claim 1, wherein the retention flange comprises a resilient leg portion and a head portion positioned an end of the resilient leg portion.

3. The push-on fastener of claim 2, wherein the release tab is punched and bent from the resilient leg portion.

4. The push-on fastener of claim 1, wherein the first angle is between 15 and 45 degrees.

5. The push-on fastener of claim 1, wherein the release tab is canted away from the retention flange at a second angle.

6. The push-on fastener of claim 5, wherein the second angle is between 80 and 100 degrees.

7. The push-on fastener of claim 1, wherein the release tab comprises a catch portion and a sidewall portion.

8. The push-on fastener of claim 7, wherein the sidewall portion is bent at an edge to form the catch portion.

9. The push-on fastener of claim 1, wherein the retention flange is configured to release the push-on fastener from the post when biased via the release tab.

10. The push-on fastener of claim 1, wherein the push-on fastener is a stamped-metal component.

11. A stamped-metal push-on fastener to couple a first component to a second component via a post associated with the second component, the stamped-metal push-on fastener comprising:

an annular body with a topside surface and an underside surface, wherein the annular body defines a retainer opening configured to receive at least a portion of the post;

a plurality of retention flanges resiliently coupled to the annular body and configured to engage the post, wherein each of the plurality of retention flanges is oriented toward a center of the retainer opening and canted away from the topside surface at a first angle; and a plurality of release tabs, wherein each of the plurality of release tabs is coupled to one of the plurality of retention flanges and configured to flex or to bias the said one of the plurality of retention flanges away from the post.

12. The stamped-metal push-on fastener of claim 11, wherein the first angle is between 15 and 45 degrees.

13. The stamped-metal push-on fastener of claim 11, wherein each of the plurality of release tabs is canted away from said one of the plurality of retention flanges at a second angle that is between 80 and 100 degrees.

14. The stamped-metal push-on fastener of claim 11, wherein each of the plurality of release tabs comprises a sidewall portion that is bent at an edge to form a catch portion.

15. The stamped-metal push-on fastener of claim 11, wherein the plurality of retention flanges is configured to release the stamped-metal push-on fastener from the post when biased via the plurality of release tabs.

16. The stamped-metal push-on fastener of claim 11, wherein the plurality of retention flanges comprises four retention flanges.

17. A stamped-metal push-on fastener to couple a first component to a second component via a post associated with the second component, the stamped-metal push-on fastener comprising:

an annular body with a topside surface and an underside surface, wherein the annular body defines a retainer opening configured to receive at least a portion of the post; and a plurality of retention flanges resiliently coupled to the annular body and configured to engage the post, wherein each of the plurality of retention flanges is oriented toward a center of the retainer opening and canted away from the topside surface at a first angle, and wherein each of the plurality of retention flanges comprises a release tab formed therein and configured to flex or to bias the retention flanges away from the post.

18. The stamped-metal push-on fastener of claim 17, wherein the release tab is canted away from the retention flange at an angle that is between 80 and 100 degrees.

19. The stamped-metal push-on fastener of claim 17, wherein the release tab comprises a sidewall portion that is bent at an edge to form a catch portion.

20. The stamped-metal push-on fastener of claim 17, wherein the plurality of retention flanges comprises four retention flanges.

* * * * *